United States Patent
Yu et al.

(10) Patent No.: US 11,025,163 B2
(45) Date of Patent: Jun. 1, 2021

(54) BOOST POWER CONVERSION CIRCUIT

(71) Applicant: HUAWEI TECHNOLOGIES CO., LTD., Shenzhen (CN)

(72) Inventors: Bo Yu, Shanghai (CN); Jinxiang Zhan, Shanghai (CN); Peiyong Li, Shenzhen (CN); Dianbo Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/913,219

(22) Filed: Jun. 26, 2020

(65) Prior Publication Data

US 2020/0328674 A1 Oct. 15, 2020

Related U.S. Application Data

(63) Continuation of application No. PCT/CN2018/123768, filed on Dec. 26, 2018.

(30) Foreign Application Priority Data

Dec. 29, 2017 (CN) .......................... 201711482027.9

(51) Int. Cl.
*H02M 1/32* (2007.01)
*H02M 3/07* (2006.01)

(52) U.S. Cl.
CPC .............. *H02M 3/07* (2013.01); *H02M 1/32* (2013.01)

(58) Field of Classification Search
CPC .......... H02M 3/158; H02M 3/07; H02M 1/32; H02M 1/36; H02M 2001/0048
See application file for complete search history.

(56) References Cited

U.S. PATENT DOCUMENTS 5,956,243 A 9/1999 Mao
2013/0021011 A1 1/2013 Okuda et al.

FOREIGN PATENT DOCUMENTS

CN 106230253 A * 12/2016 ............ H02M 3/155
CN 107070215 A * 8/2017
(Continued)

OTHER PUBLICATIONS

Extended European Search Report issued in corresponding European Patent Application No. 18893950.8, dated Nov. 5, 2020, pp. 1-7, Munich, Germany.

*Primary Examiner* — Thienvu V Tran
*Assistant Examiner* — Peter M Novak
(74) *Attorney, Agent, or Firm* — Hauptman Ham, LLP

(57) ABSTRACT

A boost power conversion circuit includes an inductor, a first switch module, a second switch module, a first unilateral conduction component, a second unilateral conduction component, a flying capacitor, an upper bus capacitor, a lower bus capacitor, and a third unilateral conduction component. The power supply, the inductor, the first switch module, and the second switch module are connected in series to form a loop. The first unilateral conduction component, the second unilateral conduction component, the upper bus capacitor and the lower bus capacitor are connected in series. The flying capacitor is electrically connected between a reverse cut-off end of the first unilateral conduction component and a forward conduction end of the second unilateral conduction component. The third unilateral conduction component is configured to clamp a voltage stress of the second switch module to a lower-bus voltage.

10 Claims, 13 Drawing Sheets

(56) References Cited

FOREIGN PATENT DOCUMENTS

| | | |
|---|---|---|
| CN | 108258899 A | 7/2018 |
| WO | 2019134670 A1 | 7/2019 |

* cited by examiner

BOOST POWER CONVERSION CIRCUIT

CROSS-REFERENCE TO RELATED APPLICATIONS

This application is a continuation of International Application No. PCT/CN2018/123768, filed on Dec. 26, 2018, which claims priority to Chinese Patent Application No. 201711482027.9, filed on Dec. 29, 2017. The disclosures of the aforementioned applications are hereby incorporated by reference in their entireties.

TECHNICAL FIELD

This application relates to the field of circuit technologies, and in particular, to a boost power conversion circuit.

BACKGROUND

A boost circuit outputs a higher voltage than a voltage input into the boost circuit, thereby implementing power conversion. A boost circuit that can implement input of at least three levels is usually referred to as a multi-level boost circuit. Under a same input condition, the multi-level boost circuit can reduce a voltage stress of a power component and use a component having a relatively low withstand voltage level, to output a voltage at a relatively high level. Compared with a conventional two-level boost circuit, the multi-level boost circuit can implement medium-voltage high-power output.

FIG. 1 shows a commonly used three-level flying-capacitor boost circuit. When the circuit is initially powered on, because a voltage of a flying capacitor is 0, T2 withstands an entire input voltage $V_{in}$. Each switching transistor in the multi-level boost circuit is usually selected according to a rule that a withstand voltage of the switching transistor is equal to a bus voltage ($V_{bus}$) multiplied by 0.5. When $V_{in}>0.5\ V_{bus}$, T2 may break down due to an overvoltage (that is, exceeding $0.5\ V_{bus}$). When a plurality of boost output sides are connected to a same bus in parallel (a plurality of multi-level boost circuits are connected in parallel), if another circuit is powered on, a voltage is established on the bus. In this case, if a multi-level boost circuit is not powered on yet, both a voltage of a flying capacitor of the multi-level boost circuit and an input voltage of the bus are 0. In this case, D4 withstands an entire bus voltage $V_{bus}$, and consequently D4 may break down due to an overvoltage.

SUMMARY

This application provides a boost power conversion circuit, so as to resolve a problem wherein a semiconductor device in a boost power conversion circuit breaks down due to an overvoltage.

A first aspect of this application provides a boost power conversion circuit. The boost power conversion circuit mainly includes a power supply, an inductor, a first switch module, a second switch module, a first unilateral conduction component, a second unilateral conduction component, a flying capacitor, and bus capacitors, the boost power conversion circuit includes a third unilateral conduction component, and the bus capacitors include an upper bus capacitor and a lower bus capacitor.

The power supply, the inductor, the first switch module, and the second switch module are connected in series sequentially to form a loop, the first unilateral conduction component, the second unilateral conduction component, and the bus capacitors are connected in series sequentially, and a forward conduction end of the first unilateral conduction component is electrically connected to a positive end of the first switch module.

A positive end of the flying capacitor is electrically connected between a reverse cut-off end of the first unilateral conduction component and a forward conduction end of the second unilateral conduction component, and a negative end of the flying capacitor is electrically connected to a forward conduction end of the third unilateral conduction component.

A reverse cut-off end of the third unilateral conduction component is electrically connected to a common point between the upper bus capacitor and the lower bus capacitor.

The third unilateral conduction component is configured to clamp a voltage stress of the second switch module to a lower-bus voltage.

Compared with an existing mechanism, in this embodiment of this application, the third unilateral conduction component is added to the boost power conversion circuit. The third unilateral conduction component clamps the second switch module to the lower-bus voltage, so as to limit the voltage stress of the second switch module and prevent the voltage stress of the second switch module from exceeding the lower-bus voltage. Therefore, when the boost power conversion circuit is initially powered on, it can be ensured that the second switch module does not need to withstand an entire input voltage because a voltage of the flying capacitor is 0. In addition, when the boost power conversion circuit operates, safety of the second switch module can be also ensured even if a bus voltage jumps. Therefore, with the third unilateral conduction component, stability of the switch module in the boost power conversion circuit can be improved.

In some implementations, the boost power conversion circuit further includes a third switch module, one end of the third switch module is electrically connected to the negative end of the flying capacitor, and the other end of the third switch module is electrically connected to a common point between the first switch module and the second switch module.

The third switch module is in an off state before the boost power conversion circuit operates, and is in an on state after the boost power conversion circuit operates.

When the power supply is not powered on, the third switch module is in the off state. When an output is not powered on but a voltage has been established on the bus (for example, in a scenario in which the boost power conversion circuit and another boost power conversion circuit are connected to the bus in parallel, and the another boost power conversion circuit is powered on), it can be ensured that the bus voltage is applied to both ends of the first unilateral conduction component and the second unilateral conduction component. Before the boost power conversion circuit operates, the third switch module remains in the off state, so that the first unilateral conduction component and the second unilateral conduction component withstand the bus voltage together, instead of that the second unilateral conduction component withstands the entire bus voltage. This avoids breakdown of the second unilateral conduction component caused by an overvoltage because the second unilateral conduction component withstands the bus voltage alone in this case.

In some implementations, because the third unilateral conduction component is introduced, when the bus voltage jumps, a voltage of the flying capacitor jumps along with the bus voltage until the voltage of the flying capacitor is greater than the upper bus voltage and reaches a steady state. In addition, because the third unilateral conduction component clamps the voltage stress of the second switch module to the lower-bus voltage, absolute safety of the second switch module in this application can be also ensured even if the bus voltage jumps. Because the circuit in this embodiment of this application is used, a problem in the existing mechanism does not occur: When a bus voltage jumps and a flying capacitor fails to track the jump in a timely manner, a voltage newly added on a bus is all applied to a second switch module, resulting in breakdown of the second switch module.

In this embodiment of this application, the boost power conversion circuit further includes an upper bus and a lower bus, and when the power supply is powered on, an output current of the power supply in the boost power conversion circuit flows through a positive end of the power supply, the inductor, the first unilateral conduction component, the flying capacitor, the third unilateral conduction component, and the lower bus, and flows back to a negative end of the power supply, to pre-charge the flying capacitor.

Because the third unilateral conduction component is added, after the power supply is powered on, the boost power conversion circuit can naturally pre-charge the flying capacitor, so that the flying capacitor is charged to half of the bus voltage. This avoids a problem that at an instant at which the second switch module emits a wave, if the voltage of the flying capacitor is 0, the second unilateral conduction component breaks down because of withstanding the entire bus voltage.

In some implementations, the boost power conversion circuit further includes a fourth unilateral conduction component, a forward conduction end of the fourth unilateral conduction component is electrically connected to the forward conduction end of the first unilateral conduction component, and a reverse cut-off end of the fourth unilateral conduction component is electrically connected to a reverse cut-off end of the second unilateral conduction component; and a forward conduction voltage drop of the fourth unilateral conduction component is lower than a forward conduction voltage drop obtained when the first unilateral conduction component and the second unilateral conduction component are connected in series, and a withstand voltage of the fourth unilateral conduction component is greater than the bus voltage.

In a phase in which the boost power conversion circuit operates, when both the first switch module and the second switch module are turned off, a freewheeling current of the inductor freewheels into the bus through the fourth unilateral conduction component. After the fourth unilateral conduction component is introduced, when the boost power conversion circuit operates, and both the first switch module and the second switch module are turned off, the freewheeling current of the inductor flows into the bus directly from the fourth unilateral conduction component, and no longer flows through the first unilateral conduction component and the second unilateral conduction component. In this way, freewheeling loss of the freewheeling current of the inductor is significantly reduced when both the first switch module and the second switch module are turned off.

BRIEF DESCRIPTION OF DRAWINGS

To describe the technical solutions in embodiments of this application or in the prior art more clearly, the following briefly describes the accompanying drawings used for describing the embodiments of this application or the prior art. Apparently, the following accompanying drawings are some embodiments of this application, and a person of ordinary skill in the art may derive other drawings from these accompanying drawings without creative efforts.

DESCRIPTION OF EMBODIMENTS

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this application is merely logical division, and there may be another division during implementation in actual application. For example, a plurality of modules may be combined or integrated into another system, or some features may be ignored or not be performed. In addition, the displayed or discussed mutual couplings or direct couplings or communications connections may be implemented through some interfaces. The indirect couplings or communications connections between the modules may be implemented in electrical or another form, and this is not limited in this application. In addition, modules or sub-modules described as separate components may be or may not be physically separated, or may be or may not be physical modules, or may be distributed to a plurality of circuit modules. Objectives of solutions of this application may be achieved by selecting some or all of the modules based on an actual requirement.

This application provides a boost power conversion circuit. The boost power conversion circuit may be deployed separately, or may be connected in parallel with another boost power conversion circuit.

Figure 1:
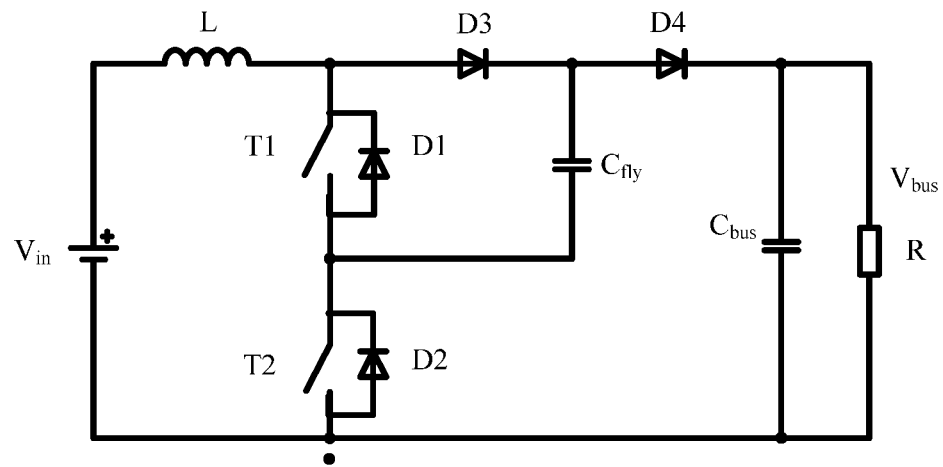
FIG. 1 is a schematic diagram of a boost power conversion circuit in an existing mechanism.

To resolve the foregoing technical problem, this application mainly provides the following technical solutions:

A switch S is added on a basis of FIG. 1. This can resolve a problem that D4 withstands an entire bus voltage when an input side is not powered on but a voltage has been established on the bus, and ensures that no overvoltage occurs on each component. A diode D6 is added, so that a voltage stress of T2 can be limited to a lower-bus voltage, and T2 does not have any risk of breakdown resulting from an overvoltage. Even if the bus voltage fluctuates quickly, for example, jumps, a voltage of a flying capacitor quickly tracks the jump of the bus voltage.

In addition, a diode D5 is further added. When both T1 and T2 are turned off, a freewheeling current of an inductor freewheels through D5, and no longer freewheels through D3 and D4 that are connected in series, thereby reducing diode loss caused during freewheeling and improving operating efficiency of a system.

Figure 2:
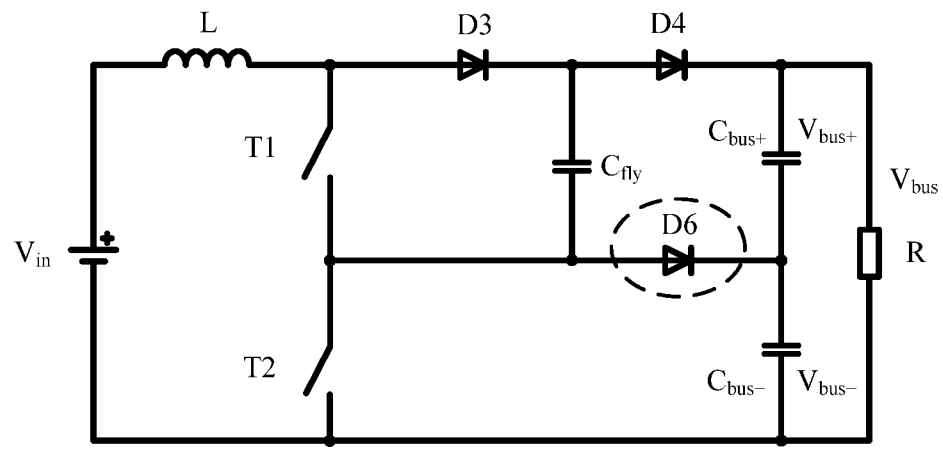
FIG. 2 is a schematic diagram of a boost power conversion circuit according to an embodiment of this application.

Referring to FIG. 2, the following describes a boost power conversion circuit provided in this application. A unilateral conduction component in the embodiments of this application may include a diode, a controller, a sampling circuit, a detection circuit, a protection circuit, or the like, or may be a separately deployed diode. This is not specifically limited in the embodiments of this application, and a diode is used as an example in all the embodiments of this application. A switch module may be a semiconductor switch with a diode connected in parallel or may directly be a reverse-conducting switching transistor. The semiconductor switch may be a metal-oxide semiconductor field-effect transistor (MOSFET) or an insulated gate bipolar transistor (IGBT). The reverse-conducting switching transistor may be a MOSFET or a reverse-conducting IGBT. This is not specifically limited in the embodiments of this application, and a semiconductor switch is used as an example.

The boost power conversion circuit in this embodiment of this application mainly includes:

a power supply $V_{in}$, an inductor L, a first switch module T1, a second switch module T2, a first unilateral conduction component D3, a second unilateral conduction component D4, a flying capacitor $C_{fly}$, bus capacitors, and a third unilateral conduction component D6. The bus capacitors include an upper bus capacitor $C_{bus+}$ and a lower bus capacitor $C_{bus-}$. The power supply, the inductor, the first switch module, and the second switch module are connected in series sequentially to form a loop, the first unilateral conduction component, the second unilateral conduction component, and the bus capacitors are connected in series sequentially, and a forward conduction end of the first unilateral conduction component is electrically connected to a positive end of the first switch module.

A positive end of the flying capacitor is electrically connected between a reverse cut-off end of the first unilateral conduction component and a forward conduction end of the second unilateral conduction component, and a negative end of the flying capacitor is electrically connected to a forward conduction end of the third unilateral conduction component.

A reverse cut-off end of the third unilateral conduction component is electrically connected to a junction point between the upper bus capacitor and the lower bus capacitor. As shown in FIG. 2, a cathode of D6 is connected between the upper bus capacitor $C_{bus+}$ and the lower bus capacitor $C_{bus-}$.

The third unilateral conduction component is configured to clamp a voltage stress of the second switch module to a lower-bus voltage.

In this embodiment of this application, the third unilateral conduction component is added to the boost power conversion circuit. The third unilateral conduction component clamps the second switch module to the lower-bus voltage, so as to limit the voltage stress of the second switch module and prevent the voltage stress of the second switch module from exceeding the lower-bus voltage. Therefore, when the boost power conversion circuit is initially powered on, it can be ensured that the second switch module does not need to withstand an entire input voltage because a voltage of the flying capacitor is 0. In addition, when the boost power conversion circuit operates, safety of the second switch module can be also ensured even if a bus voltage jumps. Therefore, with the third unilateral conduction component, safety of the switch module in the boost power conversion circuit can be improved.

Optionally, in some embodiments of this application, when an input side is not powered on but a voltage has been established on a bus, for example, the boost power conversion circuit and another boost power conversion circuit are connected to the bus in parallel, that is, the boost power conversion circuit is one of a plurality of boost power conversion circuits, both a powered-on boost power conversion circuit and a not-powered-on boost power conversion circuit may exist in the plurality of boost power conversion circuits. In this case, for the powered-on boost power conversion circuit, a voltage has been established on the bus because the boost power conversion circuit has been powered on. Correspondingly, for those not-powered-on boost power conversion circuits, a voltage has been established on the bus to which the boost power conversion circuits are connected in parallel, although the power conversion circuits have not been powered on at that time. If a withstand voltage of a second unilateral conduction component in the not-powered-on boost power conversion circuit is less than the bus voltage, the second unilateral conduction component withstands the entire bus voltage, possibly resulting in breakdown of the second unilateral conduction component caused by an overvoltage.

Figure 3:
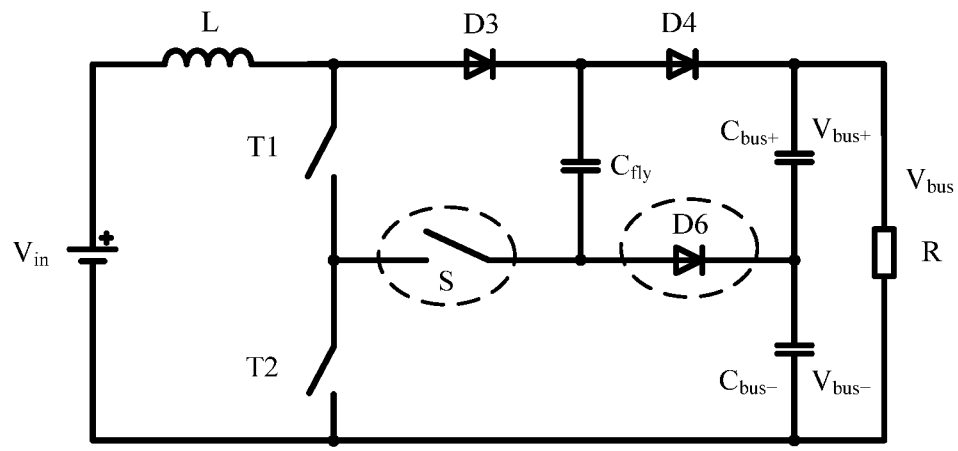
FIG. 3 is a schematic diagram of a boost power conversion circuit according to an embodiment of this application.

To avoid breakdown of the second unilateral conduction component caused by an overvoltage in a scenario in which the input side is not powered on but a voltage has been established on the bus, the circuit shown in FIG. 2 may be further improved in an embodiment of this application, for example, by adding a third switch module to the circuit shown in FIG. 2. One end of the third switch module is electrically connected to the negative end of the flying capacitor, and the other end of the third switch module is electrically connected to a common point between the first switch module and the second switch module. An improved circuit diagram is shown in FIG. 3. A basic transformation may be alternatively performed on a basis of FIG. 3. This is not limited in this application.

The third switch module is in an off state before the boost power conversion circuit operates, and is in an on state after the boost power conversion circuit operates.

Before the boost power conversion circuit operates, the third switch module remains in the off state. When the input side is not powered on but a voltage has been established on the bus, it can be ensured that the bus voltage is applied to both ends of the first unilateral conduction component and the second unilateral conduction component. In this way, the first unilateral conduction component and the second unilateral conduction component may withstand the bus voltage together, thereby avoiding breakdown of the second unilateral conduction component caused by an overvoltage because the second unilateral conduction component withstands the bus voltage alone.

Figure 4A:
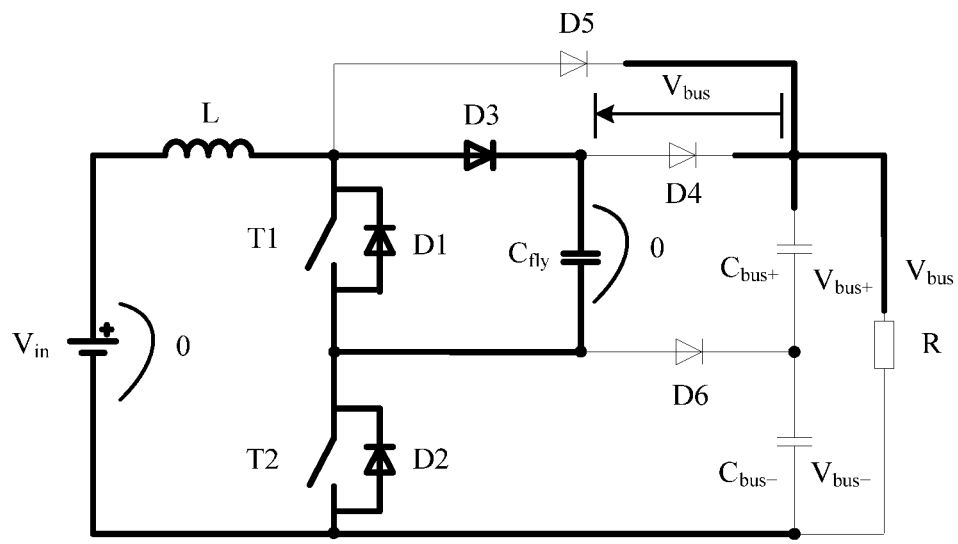
FIG. 4a is a schematic diagram of a boost power conversion circuit according to an embodiment of this application.

For ease of understanding, the following describes a current flow direction and a voltage of each component in the boost power conversion circuit before and after the third switch module is added. FIG. 4a shows a circuit before S is added, and FIG. 4b shows a circuit after S is added.

In FIG. 4a, because both a voltage $V_{Cfly}$ of a flying capacitor and an input voltage $V_{in}$ are 0 in this case, it is equivalent to that T1 is bidirectionally short-circuited by D1 and D3, and therefore $V_{in}$, the inductor L, T1, T2, D3, and the flying capacitor may be approximately considered to be equipotential (that is, a thick line portion shown in FIG. 4a). In this case, D4 withstands the entire bus voltage $V_{bus}$. If a type of D4 is selected according to 0.5 $V_{bus}$, D4 breaks down due to an overvoltage.

Figure 4B:
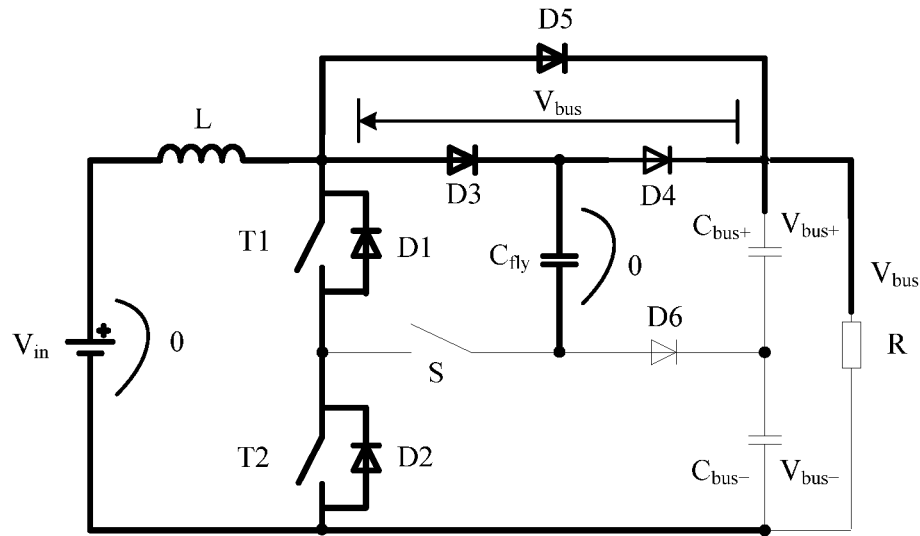
FIG. 4b is a schematic diagram of a boost power conversion circuit according to an embodiment of this application.

In FIG. 4b, S is added, and is in an off state before the circuit shown in FIG. 4b is powered on. If an input side is not powered on but a voltage has been established on the bus, the voltage of the flying capacitor is 0. Because S is opened, T1 is not bidirectionally short-circuited by D1 and D3 in this case and the bus voltage is withstood together by D3 and D4. Even if D4 is selected according to a rule that a withstand voltage of D4 is equal to $V_{bus}$ multiplied by 0.5, D4 does not have a risk of breakdown caused by an overvoltage. Compared with the circuit shown in FIG. 4a, the circuit shown in FIG. 4b can prevent breakdown of D4 caused by an overvoltage because D4 withstands the entire bus voltage $V_{bus}$.

In this embodiment of this application, the switch module S may include a normally open switch and a switch control circuit. The switch control circuit is configured to control the normally open switch to be on or off. The normally open switch may include a relay, a contactor, a semiconductor switch with a diode connected in parallel, or a reverse-conducting switching transistor with a diode connected in parallel. The semiconductor switch includes a metal-oxide semiconductor field-effect transistor or an insulated gate bipolar transistor. The reverse-conducting switching transistor includes a metal-oxide semiconductor field-effect transistor or a reverse-conducting insulated gate bipolar transistor. In addition, the switch module S is optional. When the input side is not powered on (that is, $V_{in}$=0) but a voltage has been established on the bus, and the withstand voltage of D4 is less than the bus voltage, the switch S is added. In other cases, S may be added or may not be added.

In this embodiment of this application, the third unilateral conduction component is added. Therefore, when the power supply is initially powered on, an output current of the power supply in the boost power conversion circuit flows through a positive end of the power supply, the inductor, the first unilateral conduction component, the flying capacitor, the third unilateral conduction component, and a lower bus, and flows back to a negative end of the power supply, to pre-charge the flying capacitor. In this way, the voltage of the flying capacitor is not 0, and the flying capacitor can be charged to half of the bus voltage. This can avoid a problem that at an instant at which the second switch module emits a wave, because the voltage of the flying capacitor is 0, the second unilateral conduction component breaks down because of withstanding the entire bus voltage.

Compared with an existing mechanism, this embodiment of this application does not need to introduce a dedicated pre-charge circuit to pre-charge the flying capacitor at initial power-on to protect the second switch module and the second unilateral conduction component. In this embodiment of this application, on the one hand, a clamping function of the third unilateral conduction component can ensure safety of the second switch module at initial power-on. On the other hand, the flying capacitor may be pre-charged by using a current loop (that is, a current flows from the positive end of the power supply, L, D3, $C_{fly}$, D6, a second bus, and back to the negative end of the power supply) shown in FIG. 5, so that the flying capacitor is naturally charged to half of the bus voltage. In this way, the second unilateral conduction component is protected at an instant at which the second switch module emits a wave. This can reduce a size and costs of a circuit, improve reliability of the circuit, and feature easy control.

Figure 5:
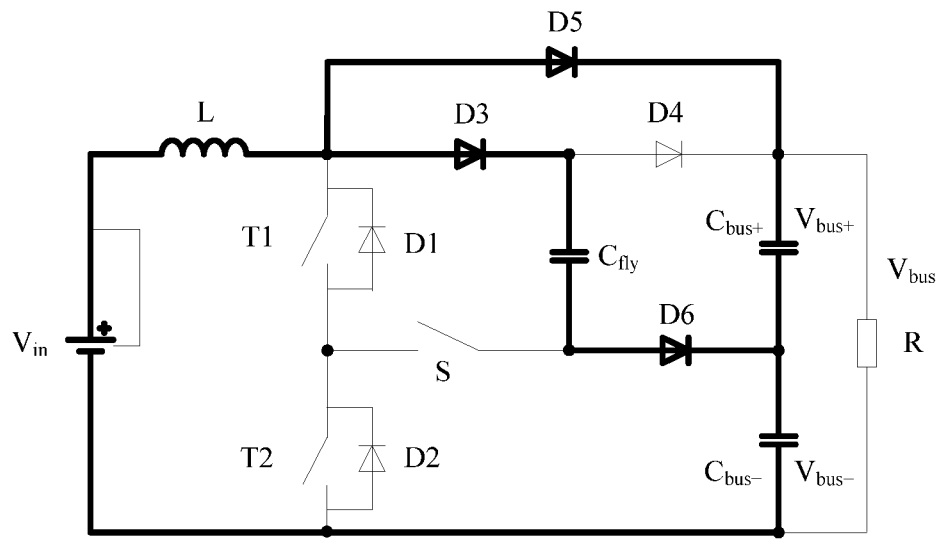
FIG. 5 is a schematic diagram of a boost power conversion circuit according to an embodiment of this application.
Figure 6A:
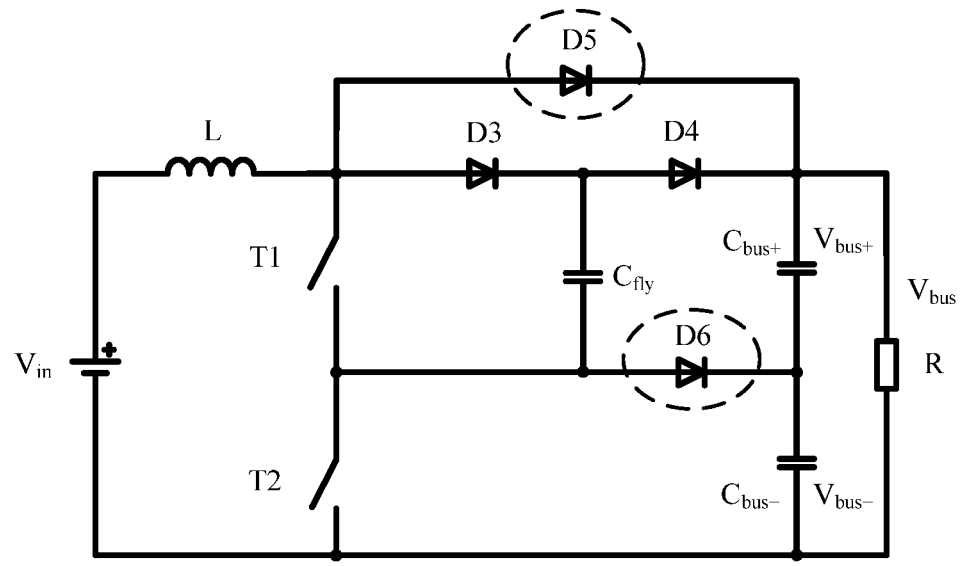
FIG. 6a is a schematic diagram of a boost power conversion circuit according to an embodiment of this application.
Figure 6B:
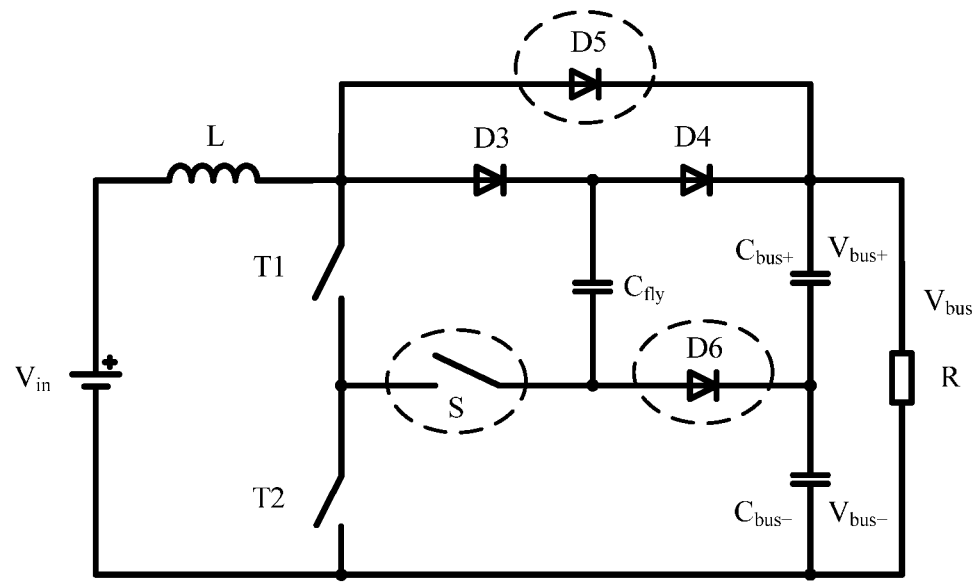
FIG. 6b is a schematic diagram of a boost power conversion circuit according to an embodiment of this application.

For example, D6 is added in FIG. 5. When an input voltage $V_{in}$ is applied to an input end of the circuit, the bus and the flying capacitor start to be charged. There are two charge loops:

One charge loop: A current flows through the positive end of the power supply, the inductor L, the diode D5, an upper bus $C_{bus+}$, and the lower bus $C_{bus-}$, and flows back to the negative end of the power supply.

The other charge loop: A current flows through the positive end of the power supply, the inductor L, the diode D3, the flying capacitor $C_{fly}$, the diode D6, and the lower bus $C_{bus-}$, and flows back to the negative end of the power supply. The entire loop may be approximately considered as that $C_{fly}$ is connected to $C_{bus+}$ in parallel and then connected to $C_{bus-}$ in series for charging. Therefore, after charging is completed, voltages of the upper bus, the lower bus, and the flying capacitor are as follows:

$$V_{bus-} = \frac{C_{bus+} + C_{fly}}{C_{bus+} + C_{fly} + C_{bus-}} \times V_{in}$$

$$V_{bus+} = V_{Cfly} = \frac{C_{bus-}}{C_{bus+} + C_{fly} + C_{bus-}} \times V_{in}$$

Because $C_{bus+} \gg C_{fly}$, $C_{bus-} \gg C_{fly}$, and $C_{bus+} = C_{bus-}$, $V_{bus+} \approx V_{bus-} \approx V_{Cfly} = 0.5 V_{in}$ In other words, the flying capacitor, the upper bus, and the lower bus are all charged to half of the input voltage $V_{in}$. Because D6 is added, $C_{fly}$ can be naturally pre-charged when the input side is powered on, so that the voltage $V_{cfly}$ of $C_{fly}$ can be charged to 0.5 $V_{bus}$. In this case, at an instant at which T2 is closed, a voltage $V_{bus} - V_{cfly}$ of D4 $\ll V_{bus}$, thereby avoiding breakdown of D4 caused by an overvoltage at an instant at which T2 emits a wave.

After charging is completed, S may be closed. In this case, T1 and T2 start to emit a wave, and the system enters a normal operating state. During normal operating, S is always in a closed state.

In the boost power conversion circuit provided in this embodiment of this application, the flying capacitor can be pre-charged at power-on, a dedicated pre-charge circuit does not need to be added, featuring easy control. This effectively reduces a size and costs of the system and improves reliability of the circuit.

Optionally, in some embodiments of this application, if the bus voltage jumps, for example, in a scenario in which an output side of the boost power conversion circuit is connected to an inverter load and the inverter is connected to a power grid, when a voltage of the power grid jumps, for example, in a case of breakdown due to a high-voltage, a current of the power grid quickly backflows to the direct current bus, resulting in rapid rise of the bus voltage $V_{bus}$ (that is, the bus voltage jumps), in the existing mechanism, as shown in FIG. 1, if the voltage of the flying capacitor fails to track the bus voltage jump in a timely manner and remains unchanged, the voltage stress (that is, $V_{bus}-V_{Cfly}$) of the second switch module T2 is higher than 0.5 $V_{bus}$, and if the second switch module T2 is selected according to a rule that a withstand voltage of the second switch module T2 is equal to $V_{bus}$ multiplied by 0.5, the second switch module T2 may consequently break down due to an overvoltage.

In this application, because the third unilateral conduction component D6 is used (for example, in the circuit shown in FIG. 3), even if the bus voltage jumps, it can also be ensured that the second switch module T2 is absolutely safe during a transient process because D6 is on. In addition, because the flying capacitor has only a charge loop during a transient process of the boost power conversion circuit, the flying capacitor can be quickly charged. Therefore, when the bus voltage jumps, the voltage of the flying capacitor jumps along with the bus voltage until the voltage of the flying capacitor is greater than the bus voltage and reaches another steady state from the transient state, so as to enable the entire circuit to quickly enter a new stable operating state.

Because the circuit in this embodiment of this application is used, a problem in the existing mechanism does not occur: When a bus voltage jumps and a flying capacitor fails to track the jump in a timely manner, a voltage newly added on a bus is all applied to a second switch module T2, resulting in breakdown of the second switch module T2.

Figure 8A:
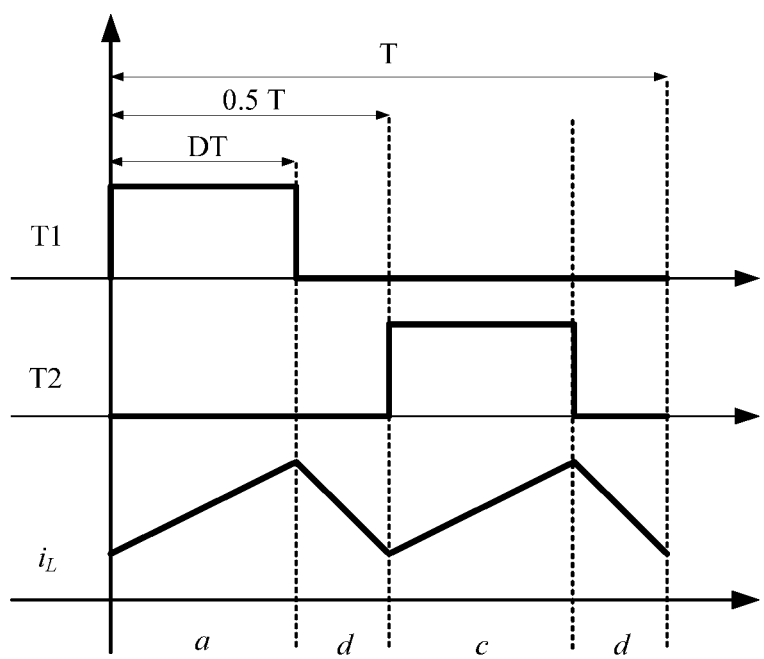
FIG. 8a is a schematic diagram of drive signals of T1 and T2 according to an embodiment of this application.
Figure 8B:
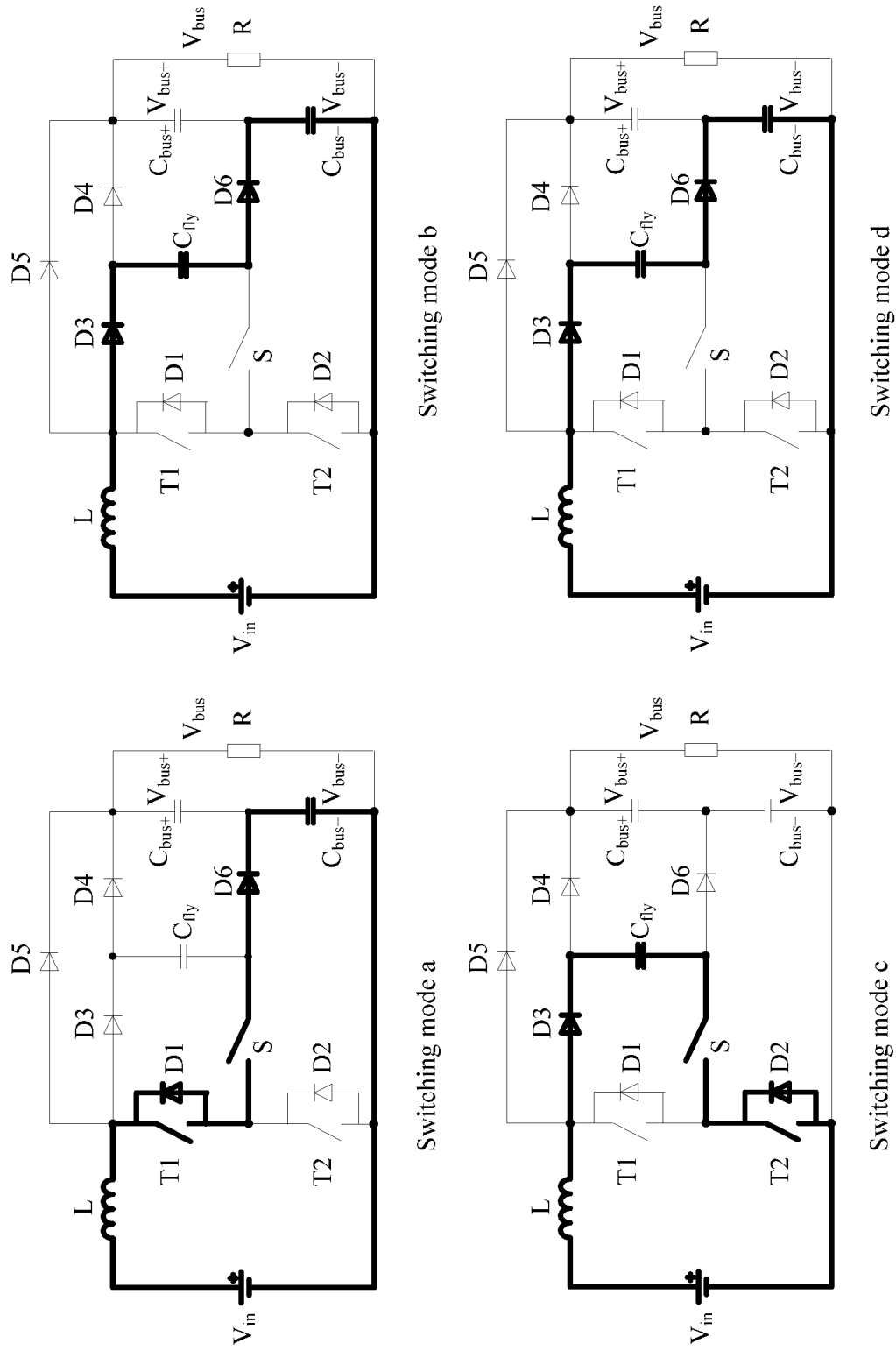
FIG. 8b is a schematic diagram of current flow paths corresponding to four switching modes according to an embodiment of this application.
Figure 10A:
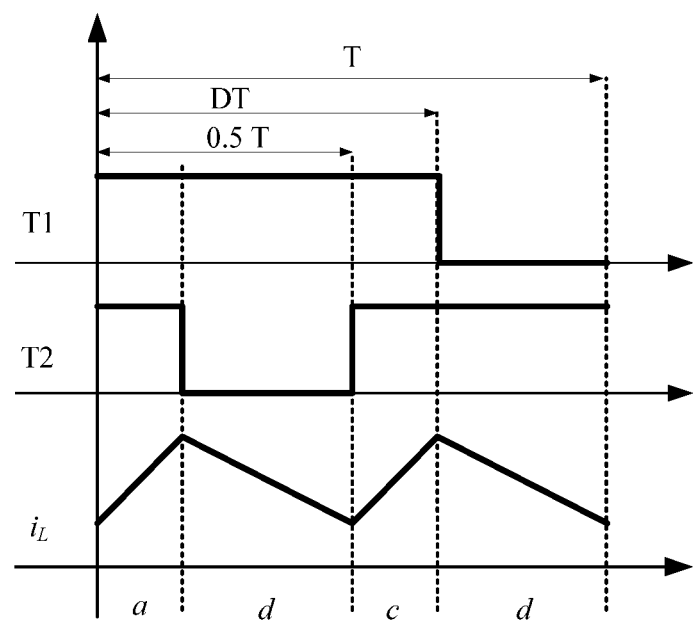
FIG. 10a is a schematic diagram of drive signals of T1 and T2 according to an embodiment of this application.
Figure 10B:
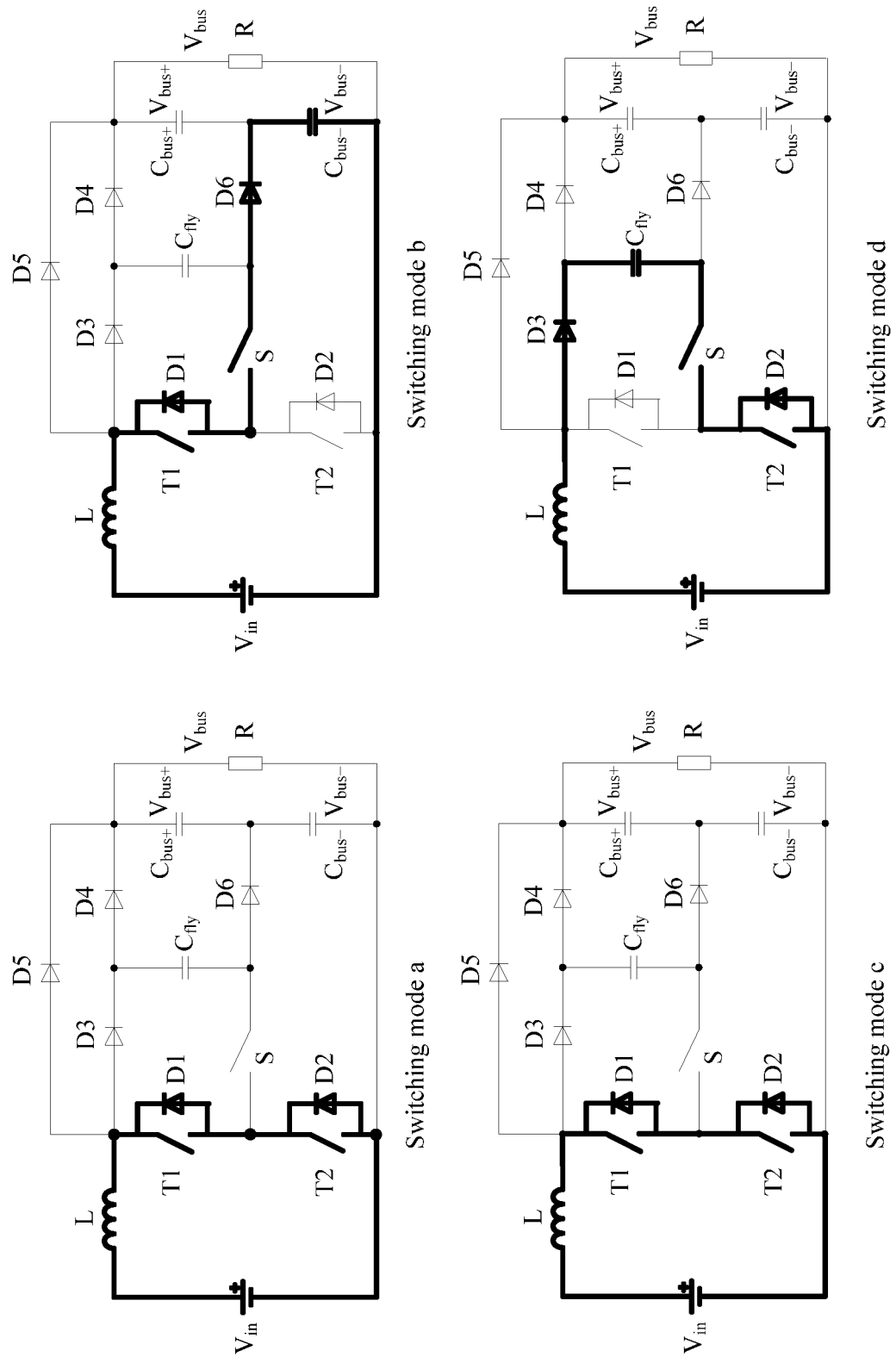
FIG. 10b is a schematic diagram of current flow paths corresponding to four switching modes according to an embodiment of this application.

For example, as shown in FIG. 8b and FIG. 10b, when the bus voltage rises suddenly, $V_{Cfly}<V_{bus+}$ may occur, and the circuit enters a transient process of $V_{Cfly}<V_{bus+}$. From current flow paths in respective switching modes in FIG. 8b and FIG. 10b, because of presence of the diode D6, it can be ensured that the voltage stress of the T2 transistor is limited to the lower-bus voltage $V_{bus-}$, and therefore it can be ensured that when the bus voltage jumps, the T2 transistor is also absolutely safe, free from an overvoltage risk. In addition, because the flying capacitor has only the charge loop but no discharge loop, even if a control process of controlling the voltage of the flying capacitor by controlling duty ratios of T1 and T2 does not function, $V_{Cfly}$ also rises rapidly to track $V_{bus+}$ until $V_{Cfly}$ exceeds $V_{bus+}$ and reaches a new steady state.

Optionally, in some embodiments of this application, through analysis based on the circuit shown in FIG. 1, when the circuit operates, if $V_{in}>0.5\ V_{bus}$ (that is, a duty ratio D<0.5), and when both T1 and T2 are in an off state, a current of the inductor flows into the bus through D3 and D4 that are connected in series. Because the freewheeling current flows through both D3 and D4, loss of the freewheeling current is increased. Especially when the input voltage $V_{in}$ is relatively high, the duty ratio D is relatively small, a freewheeling time increases accordingly, and loss of D3 and D4 also increases accordingly. To reduce the loss of the freewheeling current, a boost power conversion circuit shown in any one of FIG. 4a to FIG. 6b may further include a fourth unilateral conduction component D5, a forward conduction end of the fourth unilateral conduction component is electrically connected to the forward conduction end of the first unilateral conduction component, and a reverse cut-off end of the fourth unilateral conduction component is electrically connected to a reverse cut-off end of the second unilateral conduction component.

A forward conduction voltage drop of the fourth unilateral conduction component is lower than a forward conduction voltage drop obtained when the first unilateral conduction component and the second unilateral conduction component are connected in series, and a withstand voltage of the fourth unilateral conduction component is greater than the bus voltage (namely, a sum of an upper bus voltage and the lower-bus voltage). In some implementations, when both the first switch module and the second switch module are turned off, the freewheeling current of the inductor freewheels into the bus through the fourth unilateral conduction component. Because the fourth unilateral conduction component is added, when both the first switch module and the second switch module are in an off state, the freewheeling current of the inductor flows only through the fourth unilateral conduction component, and does not flow through the first unilateral conduction component and the second unilateral conduction component, thereby significantly reducing the loss of the freewheeling current and further improving operating efficiency of the system.

The following uses an example in which D<0.5, $V_{Cfly}>V_{bus+}$, and both T1 and T2 are in an off state. For example, as shown by a switching mode d in FIG. 7b, D5 is connected to two ends of a series branch of D3 and D4, the withstand voltage of D5 is greater than the bus voltage, and it is ensured that a conduction voltage drop of D5 is less than a conduction voltage drop obtained when D3 and D4 are connected in series. When both T1 and T2 are turned off, because the conduction voltage drop of D5 is less than the conduction voltage drop obtained when D3 and D4 are connected in series, the freewheeling current of the inductor L no longer freewheels through D3 and D4 that are connected in series, but directly freewheels through D5. Therefore, when D5 is disposed, it can be ensured that a current of the inductor freewheels into the bus through D5 and does not freewheel through D3 and D4, thereby reducing diode loss caused during freewheeling, resolving loss caused when the freewheeling current of the inductor L is input into the bus, and also improving operating efficiency of the system.

Based on the boost conversion circuit provided in this embodiment of this application, there are totally four different operating states obtained based on a comparison between the input voltage and the bus voltage and a comparison between the voltage of the flying capacitor and the upper bus voltage $V_{bus+}$:

when $V_{in}>0.5\ V_{bus}$, the duty ratio D<0.5, and $V_{Cfly}>V_{bus+}$;

when $V_{in}>0.5\ V_{bus}$, the duty ratio D<0.5, and $V_{Cfly}<V_{bus+}$;

when $V_{in}<0.5\ V_{bus}$, the duty ratio D>0.5, and $V_{Cfly}>V_{bus+}$; and when $V_{in}<0.5\ V_{bus}$, the duty ratio D>0.5, and $V_{Cfly}<V_{bus+}$.

The following specifically analyzes cases in which the boost power conversion circuit in this embodiment of this application operates.

Figure 7A:
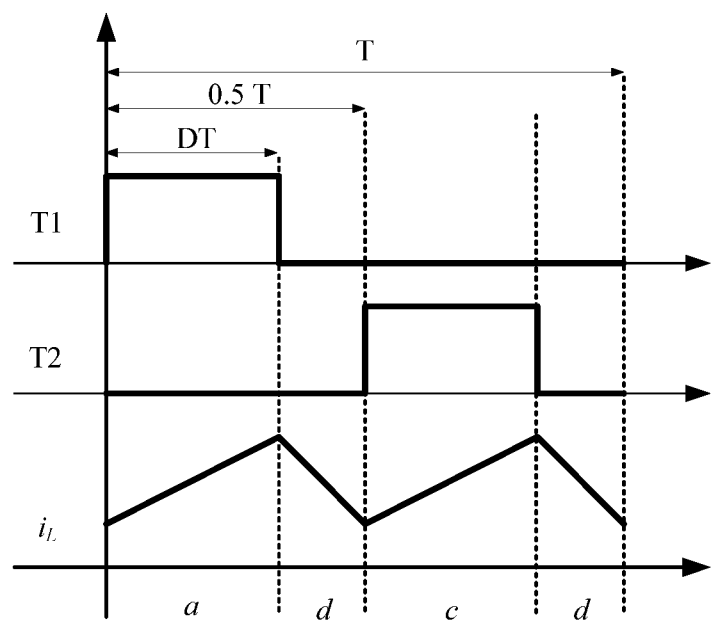
FIG. 7a is a schematic diagram of drive signals of T1 and T2 according to an embodiment of this application.
Figure 7B:
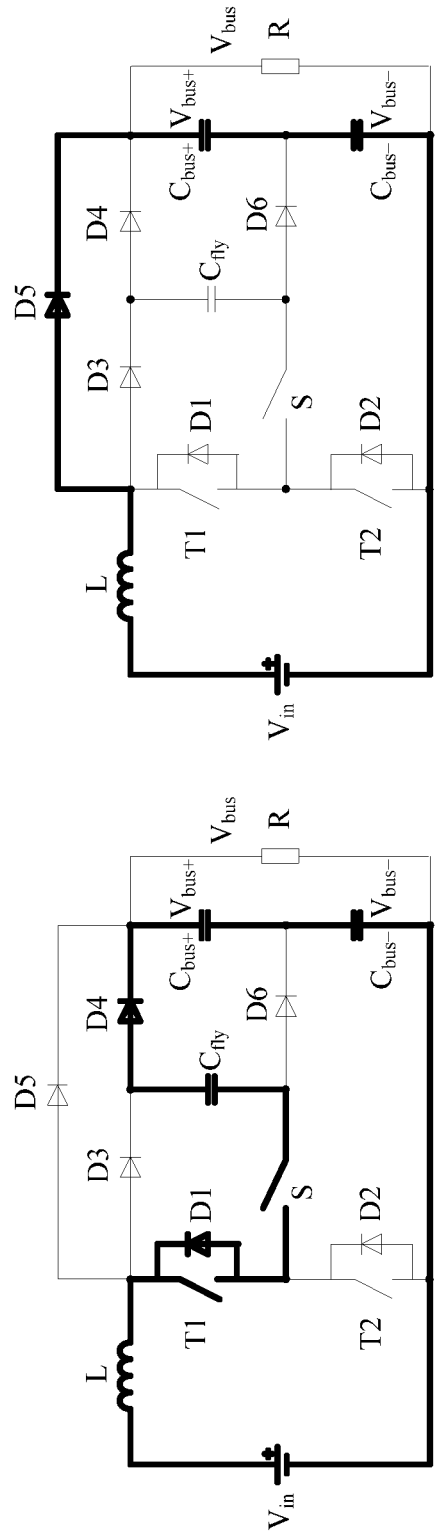
FIG. 7b is a schematic diagram of current flow paths corresponding to four switching modes according to an embodiment of this application.
Figure 7B:
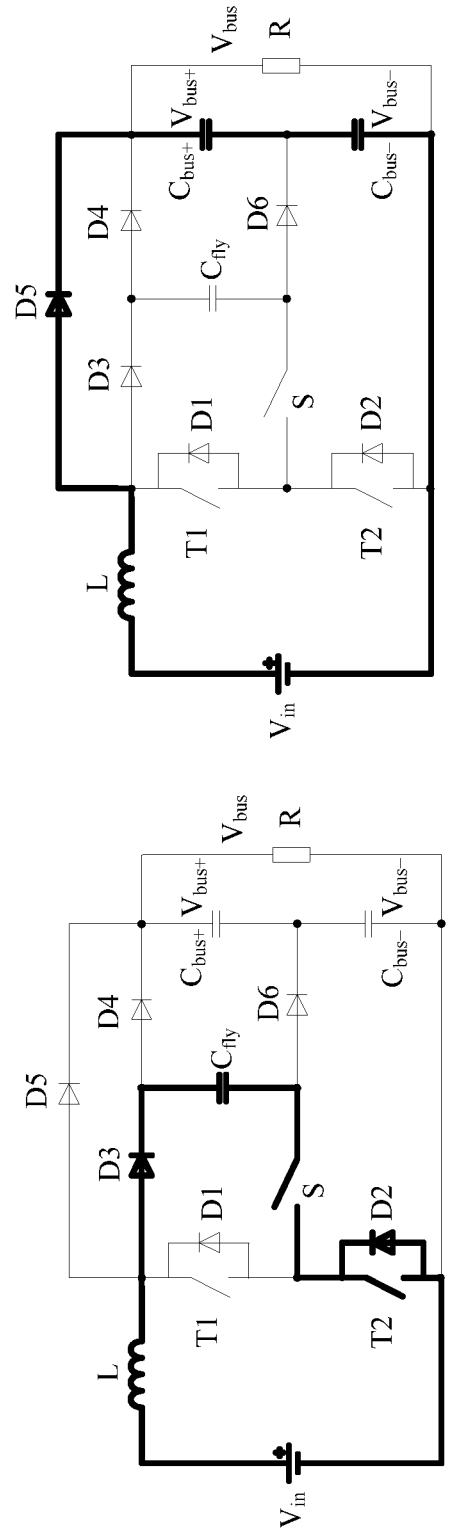

1. When D<0.5, and $V_{Cfly}>V_{bus}+$:

When the duty ratio D<0.5, and $V_{Cfly}>V_{bus+}$, a schematic diagram of drive signals of T1 and T2 and a waveform of the current of the inductor is shown in FIG. 7a. T is an on/off period, and there is a phase angle of 180 degrees between the drive signals of T1 and T2. On a basis of FIG. 7a, the boost conversion circuit shown in FIG. 5 includes a switching mode a, a switching mode b, a switching mode c, and the switching mode d that are shown in FIG. 7b. FIG. 7b is a schematic diagram of current flow paths in the switching mode a, the switching mode b, the switching mode c, and the switching mode d. The following describes the switching modes in detail.

(1) Switching Mode a:

T1 is turned on, and T2 is turned off. A current flows into the negative end of the power supply through the positive end of the power supply, L, T1, S, $C_{fly}$, D4, the upper bus $C_{bus+}$, and the lower bus $C_{bus-}$. D3, D5, and D6 are in a cut-off state.

(2) Switching Modes b and d:

The two switching modes are exactly the same, and occur twice within a same period. Both T1 and T2 are in an off state. Because it is ensured during type selection that the conduction voltage drop of D5 is less than the conduction voltage drop obtained when D3 and D4 are connected in series, the current of the inductor freewheels into the bus through D5, instead of through D3 and D4.

(3) Switching Mode c:

T2 is turned on, and T1 is turned off. A current flows into the negative end of the power supply through the positive end of the power supply, L, D3, $C_{fly}$, S, and T2. A voltage between two ends of the inductor is $V_{in}-V_{Cfly}$. D4, D5, and D6 are in a cut-off state.

Because the voltage between the two ends of the inductor complies with a volt-second balance principle, that is, a product of the voltage between the two ends of the inductor and a time within one working period is 0, the following can be obtained:

$$(V_{in}-V_{bus}+V_{Cfly}) \cdot DT + (V_{in}-V_{bus}) \cdot (1-2D)T + (V_{in}-V_{Cfly}) \cdot DT = 0$$

$$V_{bus} = \frac{V_{in}}{1-D}$$

can be obtained though simplification. An output voltage $V_{bus}$ can be controlled through control of the duty ratios of T1 and T2.

Through the foregoing analysis, when both T1 and T2 are turned off, because of presence of the D5 transistor, the current of the inductor no longer freewheels through D3 and D4 that are connected in series, but freewheels directly through D5. Because the conduction voltage drop of D5 is less than the conduction voltage drop obtained when D3 and D4 are connected in series, diode loss caused during freewheeling is reduced, and operating efficiency of the system is improved.

When the input voltage is relatively high, the duty ratio D is relatively small, a freewheeling ratio (1-2D) within one period increases, and in this case, more loss is reduced.

2. When D<0.5, and $V_{Cfly}<V_{bus+}$:

When the duty ratio D<0.5, and $V_{Cfly}<V_{bus+}$, a schematic diagram of drive signals of T1 and T2 and a waveform of the current of the inductor is shown in FIG. 8a. On a basis of FIG. 8a, the boost conversion circuit shown in FIG. 5 includes a switching mode a, a switching mode b, a switching mode c, and a switching mode d that are shown in FIG. 8b. FIG. 8b is a schematic diagram of current flow paths in the switching mode a, the switching mode b, the switching mode c, and the switching mode d. The following describes the switching modes in detail.

(1) Switching Mode a:

T1 is turned on, and T2 is turned off. A current flows into the negative end of the power supply through the positive end of the power supply, L, T1, S, D6, and the lower bus $C_{bus-}$. Because $V_{Cfly}<V_{bus+}$, the current no longer flows through $C_{fly}$ and D4 in this case, and the voltage of the flying capacitor remains unchanged.

(2) Switching Modes b and d:

The two switching modes are exactly the same, and occur twice within a same period. Both T1 and T2 are in an off state. A current flows into the negative end of the power supply through the positive end of the power supply, L, D3, $C_{fly}$, D6, and the lower bus $C_{bus-}$. Because $V_{Cfly}<V_{bus+}$, the current no longer freewheels through D5 in this case, and D4 and D5 are in a cut-off state.

(3) Switching Mode c:

T2 is turned on, and T1 is turned off. A current flows into the negative end of the power supply through the positive end of the power supply, L, D3, $C_{fly}$, S, and T2. A voltage between two ends of the inductor is $V_{in}-V_{Cfly}$. D4, D5, and D6 are in a cut-off state.

Because the current flow paths in the respective modes, in the switching mode a, the voltage of the flying capacitor remains unchanged, whereas in all the switching modes b, c, and d, the flying capacitor is charged. In other words, the flying capacitor has only the charge loop but no discharge loop. Therefore, obviously, the voltage of the flying capacitor continuously rises until $V_{Cfly}$ exceeds $V_{bus+}$ and reaches a new steady state. Therefore, a state in which $V_{Cfly}<V_{bus+}$ and that occurs when D<0.5 and the bus voltage jumps is neither a steady state, but is a transient process. Nevertheless, this state is corresponding to an advantage of this topology.

In an existing topology, when the bus voltage jumps, the bus voltage is controlled only based on the duty ratio, and the flying capacitor fails to track the jumped bus voltage in a timely manner. As a result, a voltage newly added on the bus is all applied to T2. When T2 is selected according to a rule that a voltage stress of T2 is equal to $V_{bus}$ multiplied by 0.5, the voltage newly added on the bus may cause breakdown of T2.

However, in a circuit topology shown in FIG. 5, when the bus voltage jumps, that is, when $V_{bus+}$ or $V_{bus-}$ jumps, the state in which $V_{Cfly}<V_{bus+}$ occurs, and the circuit enters this transient process. Because the current flow paths in the respective switching states in FIG. 8b, and because of presence of the diode D6, the voltage stress of the T2 transistor is limited to the lower-bus voltage $V_{bus-}$, and therefore the T2 transistor is absolutely safe, free from an overvoltage risk. In addition, because the flying capacitor has only the charge loop but no discharge loop, even if there is no control process of controlling the voltage of the flying capacitor by using the duty ratio in the existing mechanism, $V_{Cfly}$ also rises rapidly to quickly track $V_{bus+}$ until $V_{Cfly}$ exceeds $V_{bus+}$ and reaches a new steady state.

Figure 9A:
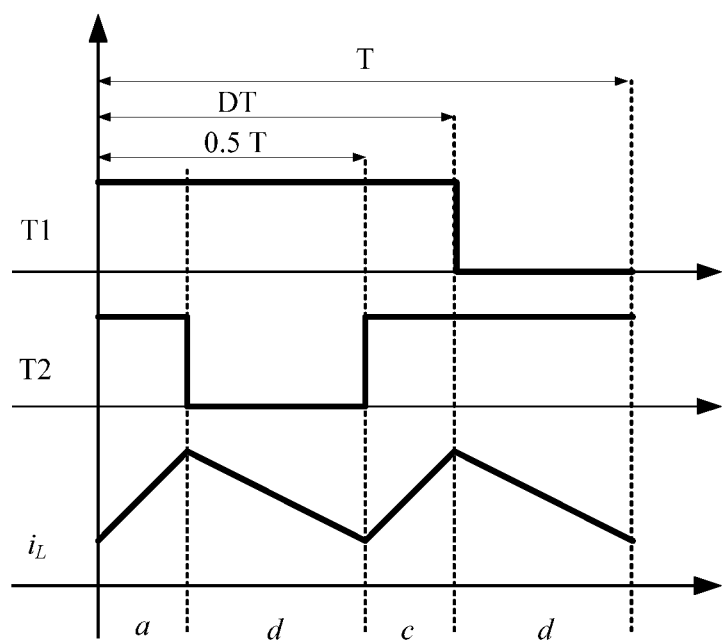
FIG. 9a is a schematic diagram of drive signals of T1 and T2 according to an embodiment of this application.
Figure 9B:
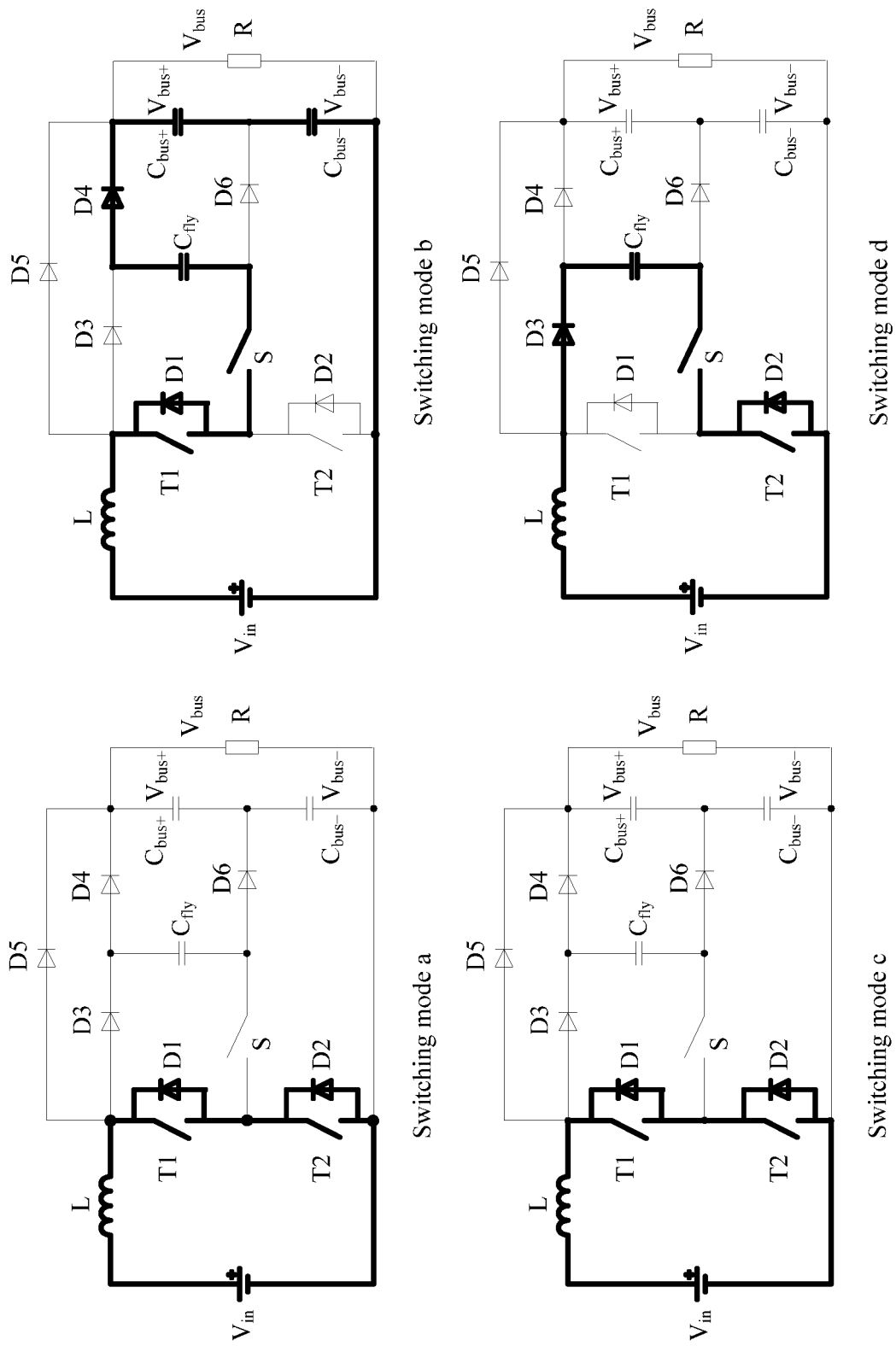
FIG. 9b is a schematic diagram of current flow paths corresponding to four switching modes according to an embodiment of this application.

3. When D>0.5, and $V_{Cfly}>V_{bus+}$:

When the duty ratio D>0.5, and $V_{Cfly}>V_{bus+}$, a schematic diagram of drive signals of T1 and T2 and a waveform of the current of the inductor is shown in FIG. 9a. On a basis of FIG. 9a, the boost conversion circuit shown in FIG. 5 includes a switching mode a, a switching mode b, a switching mode c, and a switching mode d that are shown in FIG. 9b. FIG. 9b is a schematic diagram of current flow paths in the switching mode a, the switching mode b, the switching mode c, and the switching mode d. The following describes the switching modes in detail.

(1) Switching Modes a and c:

Both T1 and T2 are in an on state. A current flows into the negative end of the power supply through the positive end of the power supply, L, T1, and T2. D3, D4, D5, and D6 are all in a cut-off state. The current of the inductor rises linearly.

(2) Switching Mode b:

T1 is turned on, and T2 is turned off. A current flows into the negative end of the power supply through the positive end of the power supply, L, T1, S, $C_{fly}$, D4, the upper bus $C_{bus+}$, and the lower bus $C_{bus-}$. D3, D5, and D6 are in a cut-off state.

(3) Switching Mode d:

T2 is turned on, and T1 is turned off. A current flows into the negative end of the power supply through the positive end of the power supply, L, D3, $C_{fly}$, S, and T2. A voltage between two ends of the inductor is $V_{in}-V_{Cfly}$. D4, D5, and D6 are in a cut-off state.

Because the voltage between the two ends of the inductor complies with a volt-second balance principle, the following can be obtained:

$$V_{in} \cdot (2D-1)T + (V_{in}-V_{bus}+V_{Cfly}) \cdot (1-D)T + (V_{in}-V_{Cfly}) \cdot (1-D)T = 0$$

$$V_{bus} = \frac{V_{in}}{1-D}$$

can be obtained through simplification. An output voltage can be controlled through control of the duty ratios of T1 and T2.

4. When D>0.5, and $V_{Cfly}<V_{bus+}$:

When the duty ratio D>0.5, and $V_{Cfly}<V_{bus+}$, a schematic diagram of drive signals of T1 and T2 and a waveform of the current of the inductor is shown in FIG. 10a. On a basis of FIG. 10a, the boost conversion circuit shown in FIG. 5 includes a switching mode a, a switching mode b, a switching mode c, and a switching mode d that are shown in FIG. 10b.

(1) Switching Modes a and c:

Both T1 and T2 are in an on state. A current flows into the negative end of the power supply through the positive end of the power supply, L, T1, and T2. D3, D4, D5, and D6 are all in a cut-off state. The current of the inductor rises linearly.

(2) Switching Mode b:

T1 is turned on, and T2 is turned off. A current flows into the negative end of the power supply through the positive end of the power supply, L, T1, S, D6, and the lower bus $C_{bus-}$. Because $V_{Cfly}<V_{bus+}$, the current no longer flows through $C_{fly}$ and D4 in this case, and the voltage of the flying capacitor remains unchanged.

(3) Switching Mode d:

T2 is turned on, and T1 is turned off. A current flows into the negative end of the power supply through the positive end of the power supply, L, D3, $C_{fly}$, S, and T2. A voltage between two ends of the inductor is $V_{in}-V_{Cfly}$. D4, D5, and D6 are in a cut-off state.

In this example, because the current flow paths in the respective modes a, b, and c, the voltage of the flying capacitor remains unchanged, whereas in the mode d, the flying capacitor is charged. In other words, the flying capacitor has only the charge loop but no discharge loop. Therefore, the voltage of the flying capacitor keeps rising until $V_{Cfly}$ exceeds $V_{bus+}$. Therefore, a state in which $V_{Cfly}<V_{bus+}$ and that occurs when D>0.5 is neither a steady state, but is a transient process.

Similarly, when the bus voltage jumps, that is, when $V_{bus+}$ or $V_{bus-}$ jumps, the state in which $V_{Cfly}<V_{bus+}$ occurs, and a circuit enters this transient process. Because the current flow paths are in the respective switching states shown in FIG. 10b, that because of presence of the diode D6, the voltage stress of the T2 transistor is limited to the lower-bus voltage $V_{bus-}$, and therefore the T2 transistor is absolutely safe, and free from an overvoltage risk. In addition, because the flying capacitor has only the charge loop but no discharge loop, even if a control process does not function, $V_{Cfly}$ also rises rapidly to track $V_{bus+}$ until $V_{Cfly}$ exceeds $V_{bus+}$ and reaches a new steady state.

The foregoing analyzes the four operating states of this topology in cases in which D>0.5, D<0.5, $V_{Cfly}>V_{bus+}$, and $V_{Cfly}<V_{bus+}$. A state in which D<0.5 and $V_{Cfly}>V_{bus+}$ and a state in which D>0.5 and $V_{Cfly}>V_{bus+}$ are two steady operating states, and the other two are transient processes.

Through analysis of embodiments corresponding to FIG. 7a to FIG. 10b, because of presence of D6, T2 is absolutely safe regardless of an operating state, free from an overvoltage risk, thereby ensuring secure and stable operation of the system. In addition, when both T1 and T2 are turned off, because of presence of D5, loss caused during freewheeling of the current of the inductor is relatively small, thereby improving operating efficiency of the system.

Figure 11:
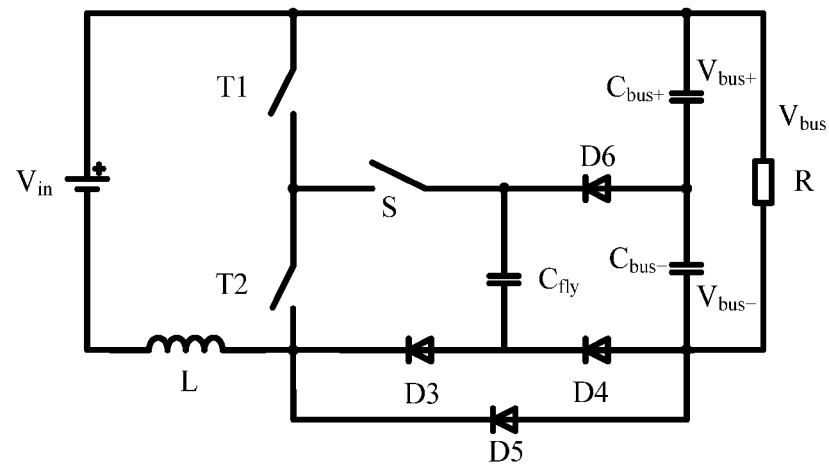
FIG. 11 is a schematic diagram of a boost power conversion circuit according to an embodiment of this application.

Optionally, in some embodiments of this application, FIG. 11 shows another connection manner of a boost conversion circuit according to this application. An inductor is connected to a negative end of an input power supply, cathodes of diodes D3 and D5 are connected to the inductor, and an anode of D6 is connected to a common point between an upper bus capacitor and a lower bus capacitor. A difference from FIG. 2 to FIG. 6b lies in that only a connection manner is changed herein. A working principle thereof remains exactly the same. For specific circuit analysis, refer to a description of any one of the embodiments corresponding to FIG. 2 to FIG. 10b, and details are not described herein again.

In the foregoing embodiments, the description of each embodiment has respective focuses. For a part that is not described in detail in an embodiment, refer to related descriptions in other embodiments.

It may be clearly understood by a person skilled in the art that, for ease and brevity of description, for detailed working processes of the foregoing described system, apparatus, and module, reference may be made to corresponding processes in the foregoing method embodiments, and details are not described herein again.

The technical solutions provided in this application are described in detail above. The principle and implementation of this application are described herein through specific examples. The description about the embodiments is merely provided to help understand the method and core ideas of this application. In addition, a person of ordinary skill in the art can make variations and modifications to this application in terms of the specific implementations and application scopes according to the ideas of this application. Therefore, the content of specification shall not be construed as a limit to this application.

What is claimed is:

1. A boost power conversion circuit, comprising:
a power supply;
an inductor;
a first switch module;

a second switch module;
a first unilateral conduction component;
a second unilateral conduction component;
a flying capacitor;
an upper bus capacitor;
a lower bus capacitor;
a third unilateral conduction component; and
a fourth unilateral conduction component,
wherein
the power supply, the inductor, the first switch module, and the second switch module are connected in series to form a loop,
the first unilateral conduction component, the second unilateral conduction component, the upper bus capacitor and the lower bus capacitor are connected in series,
a forward conduction end of the first unilateral conduction component is electrically connected to a positive end of the first switch module,
a positive end of the flying capacitor is electrically connected between a reverse cut-off end of the first unilateral conduction component and a forward conduction end of the second unilateral conduction component,
a negative end of the flying capacitor is electrically connected to a forward conduction end of the third unilateral conduction component,
a reverse cut-off end of the third unilateral conduction component is electrically connected to a junction point between the upper bus capacitor and the lower bus capacitor,
a forward conduction end of the fourth unilateral conduction component is electrically connected to the forward conduction end of the first unilateral conduction component between the inductor and the first unilateral conduction component,
a reverse cut-off end of the fourth unilateral conduction component is electrically connected to a reverse cut-off end of the second unilateral conduction component, and
the third unilateral conduction component is configured to clamp a voltage stress of the second switch module to a lower-bus voltage.

2. The boost power conversion circuit according to claim 1, further comprising:
a third switch module,
wherein a first end of the third switch module is electrically connected to the negative end of the flying capacitor, and a second end of the third switch module is electrically connected to a common point between the first switch module and the second switch module.

3. The boost power conversion circuit according to claim 2, wherein the third switch module is in an off state before the boost power conversion circuit operates, and the third switch module is in an on state after the boost power conversion circuit operates.

4. The boost power conversion circuit according to claim 3, further comprising:
a bus, comprising the upper bus capacitor and the lower bus capacitor,
wherein
the third switch module is configured to be in the off state if the power supply is not powered on, but a bus voltage has been established on the bus and a voltage stress of the second unilateral conduction component is less than the bus voltage, and
with the third switch module is in the off state, the bus voltage is applied to both ends of the first unilateral conduction component and the second unilateral conduction component, and the bus voltage is a sum of an upper bus voltage and the lower-bus voltage.

5. The boost power conversion circuit according to claim 4, wherein the boost power conversion circuit causes the bus voltage to jump and a voltage of the flying capacitor to jump in a manner corresponding to the bus voltage in operation.

6. The boost power conversion circuit according to claim 2, further comprising:
an upper bus comprising the upper bus capacitor; and
a lower bus comprising the lower bus capacitor,
wherein the flying capacitor is pre-charged by powering on the power supply such that an output current of the power supply in the boost power conversion circuit flows through a positive end of the power supply, the inductor, the first unilateral conduction component, the flying capacitor, the third unilateral conduction component, the lower bus, and back to a negative end of the power supply.

7. The boost power conversion circuit according to claim 1, wherein
a forward conduction voltage drop of the fourth unilateral conduction component is lower than a forward conduction voltage drop of the first unilateral conduction component and the second unilateral conduction component connected in series, and
a withstand voltage of the fourth unilateral conduction component is greater than the bus voltage.

8. The boost power conversion circuit according to claim 7, wherein in a phase in which the boost power conversion circuit operates, and both the first switch module and the second switch module are turned off, a freewheeling current of the inductor freewheels into the bus through the fourth unilateral conduction component.

9. The boost power conversion circuit according to claim 1, wherein the power supply, the inductor, the first switch module, and the second switch module are sequentially connected in series to form the loop.

10. The boost power conversion circuit according to claim 9, wherein the first unilateral conduction component, the second unilateral conduction component, the upper bus capacitor and the lower bus capacitor are sequentially connected in series.

* * * * *